United States Patent [19]

Rodriguez et al.

[11] 4,066,920

[45] Jan. 3, 1978

[54] ELECTROSTATICALLY CHARGEABLE DEVICE

[76] Inventors: Paul L. Rodriguez, 2116 Center St., Garden City, Kans. 66030; William A. Rhodes, 4421 N. 13th Place, Phoenix, Ariz. 85014

[21] Appl. No.: 700,459

[22] Filed: June 28, 1976

[51] Int. Cl.² .............................................. H02N 1/04
[52] U.S. Cl. .................................. 310/310; 35/19 A
[58] Field of Search ........................................ 310/5–7; 35/19 R, 19 A

[56] References Cited

U.S. PATENT DOCUMENTS

| 2,739,248 | 3/1956 | Meier ........................................ 310/6 |
| 3,047,748 | 7/1962 | Landsverk et al. ...................... 310/7 |
| 3,192,414 | 6/1965 | Rensser ................................... 310/6 |

OTHER PUBLICATIONS

Cenco Educational Catalog, "Physics"Electrostatics, p. 83.

*Primary Examiner*—Donovan F. Duggan
*Attorney, Agent, or Firm*—Wm. H. Dean; Don J. Flickinger

[57] ABSTRACT

The disclosure relates to an electrostatically rechargeable device comprising a body having a rubbing end adapted to be rubbed against fabric or other material for electrostatically charging the device. The device is preferably made of teflon and may utilize a metal cap thereon with "Teflon" (Polytetrafluoroethylene) on the outer side thereof, and the device is provided with a series of lands and grooves around its intermediate portion to extend the surface dimension thereof from the chargeable end to the opposite end to thereby inhibit the leakage of electrostatic charges from the chargeable end thereof.

11 Claims, 4 Drawing Figures

ELECTROSTATICALLY CHARGEABLE DEVICE

BACKGROUND OF THE INVENTION

Various devices have heretofore been electrostatically charged by rubbing them on fibrous materials. However, prior art electrostatically chargeable devices have been incapable of storing high voltages for substantial lengths of time. Additionally, various electrostatically chargeable materials and devices have been chargeable, such that the polarity thereof may vary from either positive to negative, and many electrostatically chargeable materials have had a high energy leakage rate, such that electrostatic charges are only momentary or stored for short periods of time.

SUMMARY OF THE INVENTION

The present invention comprises an electrostatically chargeable device preferably made of "Teflon" (Polytetraflouroethylene) which readily and easily in chargeable with high voltage and which tends to retain the electrical energy for long periods of time. Additionally, the device is provided with an elongated body having a series of lands and grooves which extends the leakage path at considerable distance from the chargeable end of the device which is usually charged Nylon"rubbing it against a fibrous material, such as "Nylong" or cotton. It has been found that "Teflon" material has a polarity which is always negative toward materials against which it is frictionally actuated. While "Teflon" is primarily capable of maintaining a negative polarity, "Nylon" fabric or fibres tend to maintain a positive polarity, and it has been found that "Nylon" is a preferred material on which to frictionally activate "Teflon" such as to induce a negative electrostatic charge. The device of the invention is therefore preferably made of "Teflon" and preferably charged against a fabric material of "Nylon". The device of the invention is provided with a base having an opening therein which frictionally fits one end of the base of the device of the invention for supporting it in a generally elongate upright position. In accordance with one specie of the invention, the chargeable end of the body is covered with a metal cap which is in turn covered with "Teflon" or "Nylon" so as to afford the storage of either positive or negative charges in the device of the invention.

Accordingly, it is an object of the present invention to provide an electrostatic novelty.

Another object of the invention is to provide a means for generating and storing electrostatic charges over long periods of time for use as an experimental field.

Another object of the invention is to provide generation and storage of electrostatic charges without power supplies or belts.

Another object of the invention is to provide a simple and reliable frictionally electrostatic source under various atmospheric conditions.

Another object of the invention is to provide a very reliable source of electrostatic energy for laboratories and schools.

A further object of the invention is to provide a limited source of negative ions.

A further object of the invention is to provide a very simple and economical electrostatically chargeable device which will hold substantial charges of electrostatic energy for long periods of time.

Another object of the invention is to provide an electrostatically chargeable device which will hold substantial charges of electrostatic energy either in positive or negative polarity for very substantial periods of time.

Another object of the invention is to provide an electrostatically chargeable device which may be very economically produced and very simply charged.

A further object of the invention is to provide an electrostatically chargeable device having a chargeable end which is generally hemispherical in shape and capable of being charged to near theoretical maximum for the radius of the hemispherical configuration.

Further objects and advantages of the invention may be apparent from the following specification and appended claims and accompanying drawings.

DESCRIPTION OF THE PREFERRED EMBODIMENTS

Figure 1:
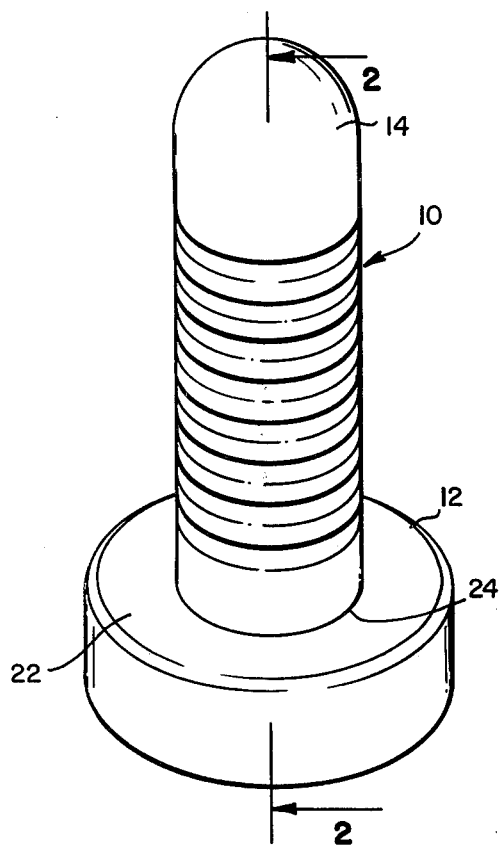
FIG. 1 is a perspective view of an electrostatically chargeable device in accordance with the present invention.

As shown in FIG. 1 of the drawings, the electrostatically chargeable device of the invention is provided with a body 10 and a base 12. The body 10 is made of electrostatically chargeably material, preferably "Teflon" (Polytetraflouroethylene), and is provided with a generally hemispherical first end 14 which is adapted to be rubbed against a fabric material such as "Nylon", cotton or other suitable material to attain an electrostatic charge. The body 10 is preferably circular in cross-section and is an elongate structure having a series of grooves 16 formed in the periphery thereof between which lands 18 are disposed. The lands and grooves 18 and 16 are continuous around the periphery of the body, and thus form a labyrinth which tends to limit leakage of an electrostatic charge longitudinally of the body 10 from its first chargeable end 14 to its second end 20, which is generally a support or base connected end adapted to be supported in a base 22 which is provided with a bore 24 frictionally engaging the periphery 26 of the base end 20, which is also termed the second end, as will be hereinafter described relative to the claims. The base 22 is larger in diameter than the body 10 and serves to provide a stable support for maintaining the body 10 in an upright position as shown in FIGS. 1, 2, 3 and 4 of the drawings. The base 22 may be held during the rubbing of the spheroid or hemispherical end 14 of the body 10 during charging operations such as the rubbing of the end 14 on a "Nylon" fabric or the like. The base 22 has a flat bottom surface 28 adapted to rest on any support, such as a tabletop or the like, which is indicated by broken line 30 in FIG. 2 of the drawings.

In depths of the grooves 16 and relative extension of the lands 18 may vary as desired in order to establish the greatest distance between the ends 14 and 20 to resist leakage of the charge of electrostatic energy at the end 14, and the radius of the end 14 designated 32 may vary as desired, so as to provide a variance of capacity of electrostatically chargeable device of the invention, as will be hereinafter described.

Figure 2:
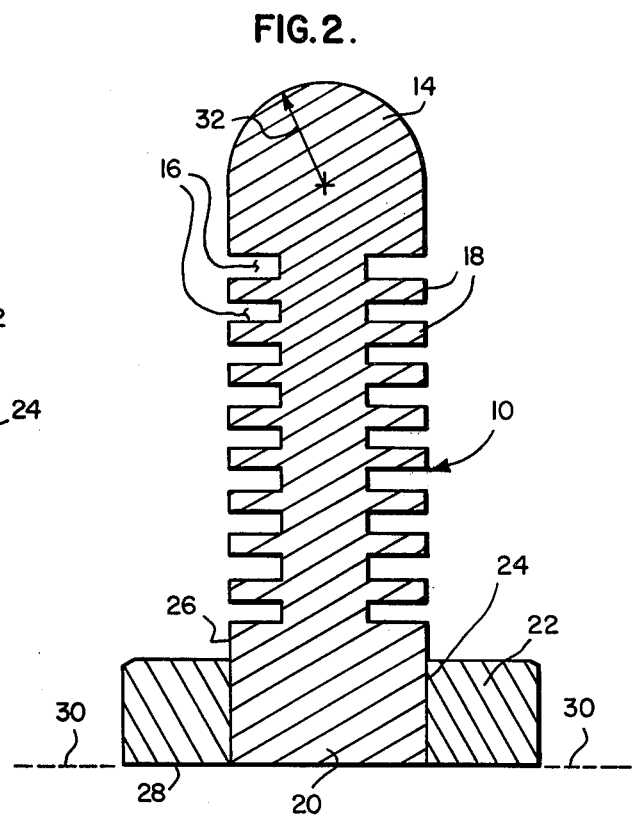
FIG. 2 is a sectional view taken from the line 2—2 of FIG. 1.

In operation, the end 14 may be rubbed in "Nylon" fabric or cotton fabric, while the base 22 is held in a person's hand, and the device may then be placed in the position as shown in FIG. 2 and energy may be discharged from the spherical or curved end 14 in various ways. As for example, a small gas-filled electrical discharge lamp, which turns on above 70 volts or has a trigger voltage in approximately that amount, may be used to demonstrate a charge which may be stored in the electrostatic device of the invention. The gas-filled electrical discharge lamp may be placed in close proximity to the end 14 and it will glow many successive times; the demonstration of such may be more profound in a darkened room. In practice, a device of the invention having a ¾ inch diameter or a ⅜ inch radius, which corresponds to the radius 32 in FIG. 2 of the drawings, has been tested, and at least 80 discharge illuminations of such a lamp have been attained without electrostatically recharging the device. It will be appreciated by those skilled in the art that "Teflon" retains a charge a greater period of time than any other known material, and stores a relatively high voltage over a great period of time.

When it is desired to utilize the invention, it is assembled as shown in FIG. 2 of the drawings, and the spheroid end 14 is rubbed against a piece of "Nylon", such as a "Nylon" carpeting material, or a cotton carpet material is also suitable for charging the electrostatic device of the invention. Using "Nylon" as a preferred media, one or two short strokes over the "Nylon" fibres will charge the device to the maximum and no additional charge may be gained by continuous or vigorous rubbing.

After rubbing the spheroid tip 14 of the body 10, it will be charged negatively to about 10,000 volts. Such a charge will last from 1 to 2 hours, and the device may readily be recharged at any time by repeated rubbing in the "Nylon" or cotton fibres or fabric. The base 22 should be handled only, without touching the body 10, so as to prevent discharge of the energy from the end 14 of the body 10. A test of the charge may be made by placing the end 14 near a person's ear, and a snapping sound may be heard as the end 14 is discharged harmlessly in the skin in the area of the ear. With such a test, if a snap is not heard, or a discharge of energy is not apparent, it is possible that the material on which the end 14 has been rubbed is not "Nylon" or cotton, or may be moist. The device of the invention will charge with rubbing on "Nylon" or cotton in most humid weather conditions, but it will not do so if the material against which it is rubbed is damp. Sometimes, certain fabric conditioners contain moisturizers, even though they feel dry to the touch, and such damp materials are incapable of producing a substantial or noticeable electrostatic charge when rubbed by the end 14 of the body 10. Many other materials not previously mentioned will produce charge on "Teflon" which is always negative. Under no circumstances has a situation developed wherein the rubbing of "Teflon" on any material will leave a positive electrostatic charge.

The uses of the device of the invention are numerous. It can be used as a source of negative ions. It can be used in schools for static demonstration purposes. It can also be used as a novelty.

A simple demonstration of the high voltage available is to pull from a cotton ball a very small amount of cotton lint. The smaller the better. The lint may be held in the left hand and the device of the invention may be charged by rubbing on "Nylon" or the like. Then, when in the middle of a building room, where the air is very quiet, the limit may be released directly over the tip 14 of the body 10, and the release should be made about a foot above the end 14, and if the experiment is properly done, the tip, when directed toward the lint will attract the lint toward the end 14, and if the lint falls to one side, it will be repelled around the body 10 to the holder's hand which is engaged with the base 22. Assuming that the lint falls in a dead center position above the end 14, with the end pointing upwardly, it will be noticed that the lint filaments slowly stretch upwardly. This is caused by electrons forming negative ions with air molecules, and these travel along the lint fibres until they are coated completely. Under such conditions, the lint should be undisturbed and suddenly, since like charges repel, the lint will jump into the air 6 to 8 inches above the end 14. The lint movement from such elevated position is slow and the lint may be juggled in mid-air by means of the electrostatic device of the invention for a great period of time.

A 6 inch separation between the end 14 and the lint is average in a dry atmosphere. From this experiment it will be realized to what extent the distance of this negative field extends. The actual field is many times that which you see with the lint experiment. Since the lint weighs a few milligrams, the field must compress between the lint and the end 14 and therefore the negative field is actually many times the distance observed between end 14 and the lint.

To achieve maximum distance between the lint and the end 14, discard the lint if it passes to one side and engages the holder's hand, since once it is charged, it is difficult if not impossible to manage the lint thereafter, and therefore, once compressed between the fingers, it is useless because it falls too rapidly to control flight. Thus, the maximum performance is attained by using a fresh piece of lint for each experiment, as desired.

The radium 32, while it may vary according to requirements, is capable of storing a large amount of energy in proportion to its size when the body is made of "Teflon".

It will be noted that a radius of 0.3750 inches in a metallic sphere is capable of storing up to 26 kilovolts. Beyond that voltage, such diameter becomes a point source in space and allows the charge to dissipate into atmosphere down to 26 kilovolts, after which leakage along the support member plus cosmic and other ionizing radiation eventually reduces the charge to zero. Accordingly, a 0.375 radius becomes a point in space to voltages above 26 kilovolts, thus dissipating voltages above 26 kilovolts while storing voltages under 26 kilovolts on the surface.

In the electrical industry, it is well established that a metallic sphere of 1 inch radius acquires its charge limit in space 70 kilovolts.

The ability to store such a charge at the end of such an insulator is increased several fold when the leakage path is lengthened through grooving of the supporting surfaces as shown in FIGS. 1 and 2, namely the path being lengthened by means of the alternate grooves and lands 16 and 18 respectively. The use of "Teflon" in relation to the present invention permits 10 kilovolts to be easily attained and maintained over long periods. Other plastic materials likewise exhibit this trait, however frictional voltages are substantially lower and on the order of 3 to 6 kilovolts and the leakage rate is sufficient to reduce the voltage to zero within a short time. A further advantage of "Teflon" as a choice in producing the electrostatic device of the invention is the ability of this material to generate such a charge in relatively high humidity which would render other materials useless. For example, with a relative humidity of 60%, 81 distinct discharges were noted when the aforementiond small gas-filled lamp was used, as hereinbefore described, and the lamp was caused to glow as it was alternately moved near to and away from the end 14 of the body 10. Thus, total discharge from the "Teflon" does not occur from a single conductive contact area thereof.

Figure 3:
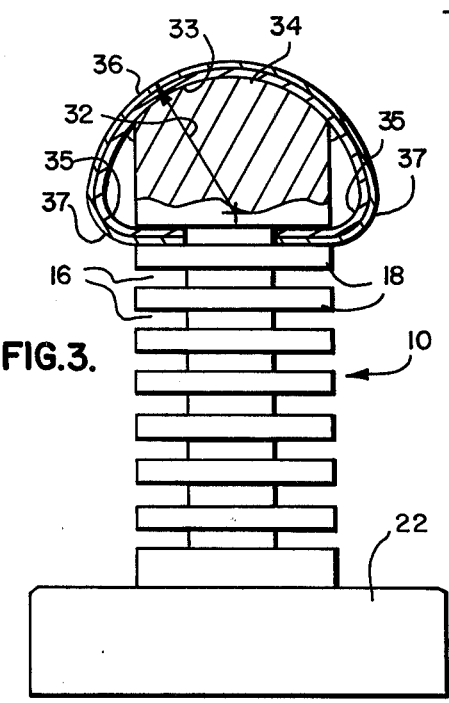
FIG. 3 is a side elevational view of a modified form of the invention, showing portions thereof broken away and in section to amplify the illustration.
Figure 4:
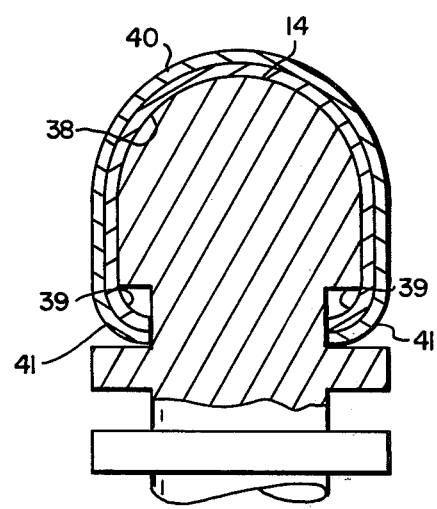
FIG. 4 is a view similar to FIG. 3 showing a further modification of the invention.

In order to increase the operation of the device, the species shown in FIGS. 3, and 4 may be resorted to.

Utilizing these spacies, it was found that when a hemisperical cap is placed on the end 14 of the body 10, and when the cap is coated with "Teflon", the voltages attained by friction are very near the theoretical limit for the radius 32.

As shown in FIG. 3 of the drawings, the base 22 supports the body 10 which is provided with the same lands and grooves 18 and 16 as those disclosed in FIGS. 2 of the drawings, and a hemispherical metal cap 33 is placed on an end 34 of the body 10. This hemispherical cap 33 is of a diametrical dimension larger than the diameter of the body 10 and a "Teflon" or "Nylon" coating 36 is placed on the metal cap 33 is opposed relation to the end 34 of the body 10. The cap 33 and the coating 36 have annular inwardly curved portions 35 and 37 respectively, which extend to the periphery of the body 10. Thus, the concentration of higher voltages may be attained in proportion to increase of radius when the coating 36 is rubbed on a "Nylon" carpet or other suitable fabric or fibrous material, and it will be seen that the difference in diameter between the cap 32 and the body 10 is such as to afford a relatively large radius 38 for the rubbing or charging end of the device, as compared to the cross-sectional radius of the body 10 at its lands 18 and grooves 16. Since the metallic cap acts as a collector of surface charge, discharge currents are higher and substantialy total discharge occurs upon first approach of a conducting body.

In the modification as shown in FIG. 4, a metal cap 38 is placed on the end 14 of the body 10 and a plastic coating such as "Teflon" or "Nylon" designated 40 is placed on the outer side of the metal cap 38. The radius of the metal cap 38 and a coating 40 conform to the end 14 and are of a substantially similar radius in contrast to the large radius of the cap 34 as shown in FIG. 3 of the drawings. The cap 38 and the coating 40 have annular inwardly curved portions 39 and 41 respectively which extend to the periphery of the body 10. As hereinbefore pointed out, the charging of the device shown in FIGS. 3 and 4 of the drawings may be such as to reach voltages near the theoretical limit for the particular radius.

It will be understood that when the coating 36 or 40 is of "Nylon", a positive charge may be retained therein for substantially the same period of time as found with the "Teflon" and it will be understood as hereinbefore described that the use of "Teflon" for the coating 36 or 40 will result in the maintenance of a negative charge, as hereinbefore described.

In the event the nylon coating is placed on the cap 32 or 38 with the body 10 of "Teflon", the result will be limiting voltages attainable for that radius, such as the radius 38, as hereinbefore described.

It will be obvious to those skilled in the art that various modifications may be resorted to without departing from the spirit of the invention.

I claim:

1. An electrostatically chargeable device consisting of a body; said body being an elongate, generally cylindrical shape and made of electrostatically chargeable material; said body having first and second opposite ends; said first end adapted to be rubbed on a fibrous material for electrostatically charging the same; said body having a longitudinal axis and having a series of endless parallel peripheral grooves and lands disposed at an angle to said longitudinal axis thereby affording a relatively great surface dimension between said first and second ends as compared to the overall length of said body.

2. The invention as defined in claim 1, wherein: a metal cap is disposed on said first end.

3. The invention as defined in claim 2, wherein: a coating of electrostatically chargeable material is disposed on said metal cap in opposed relation to said body.

4. The invention as defined in claim 3, wherein: said first end, said cap and said coating being generally spheroid in shape.

5. The invention as defined in claim 1, wherein: said body is made of Polytetraflouroethylene.

6. The invention as defined in claim 1, wherein: said body is made of "Nylon."

7. The invention as defined in claim 3, wherein: said coating is made of Polytetraflouroethylene.

8. The invention as defined in claim 3, wherein: said coating is made of "Nylon."

9. The invention as defined in claim 1, wherein: said first end is generally spheroid in shape; said first end extending to the periphery of said body.

10. The invention as defined in claim 1, wherein: a base member is provided with an opening therein; said second end of said body disposed in said opening in said base; said base being of greater cross-sectional area than said body, and thus adapted to support said body in elongate generally upright disposition.

11. The invention as defined in claim 10, wherein: said opening in said body is of a dimension to frictionally grip and hold to said body.

* * * * *